United States Patent
Brooks

[11] 4,015,427
[45] Apr. 5, 1977

[54] FUEL GRAIN FOR SPHERICAL BOOST-SUSTAIN ROCKET MOTOR

[75] Inventor: William T. Brooks, Waco, Tex.

[73] Assignee: The United States of America as represented by the Secretary of the Air Force, Washington, D.C.

[22] Filed: Nov. 12, 1975

[21] Appl. No.: 631,280

[52] U.S. Cl. .................................... 60/253; 102/99
[51] Int. Cl.$^2$ ........................................... F02K 9/04
[58] Field of Search ........................ 60/253–256, 60/39.47; 102/49.8, 99–104

[56] References Cited
UNITED STATES PATENTS

| | | | |
|---|---|---|---|
| 3,001,363 | 9/1961 | Thibodaux et al. | 60/256 |
| 3,121,309 | 2/1964 | O'Donnell | 60/253 |
| 3,760,589 | 9/1973 | Puckett et al. | 60/253 |
| 3,855,789 | 12/1974 | Platzek | 60/253 |

OTHER PUBLICATIONS

Barrere, M., et al., "Rocket Propulsion," Elsevier Pub. Co., 1960, pp. 292, 293.

Primary Examiner—Carlton R. Croyle
Assistant Examiner—Robert E. Garrett
Attorney, Agent, or Firm—Joseph E. Rusz; Richard J. Killoren

[57] ABSTRACT

A spherical solid rocket motor for delivering boost-sustain, thrust-time performance and having a fuel grain with eight slots, at the forward end of the fuel grain, and eight star point segments forming regressive burning surface configurations. The fuel grain also has eight segments, with parallel sides, positioned between the star point segments to provide a large burning surface for boost and a sharp transition from boost to sustain operation.

1 Claim, 8 Drawing Figures

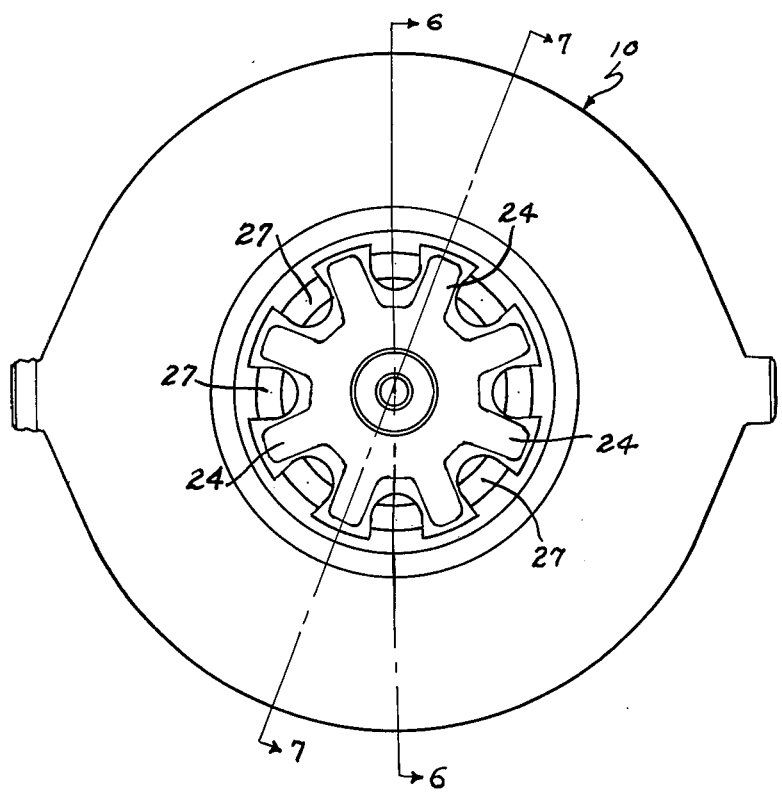
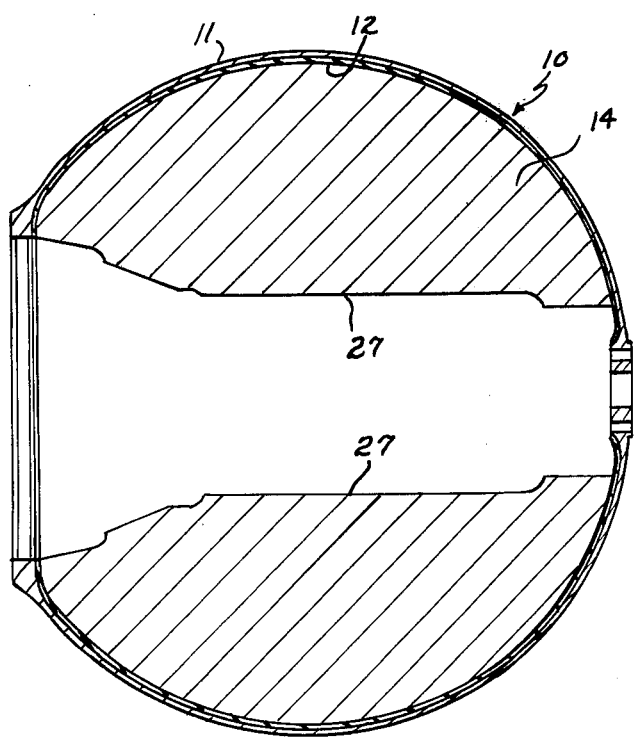

FUEL GRAIN FOR SPHERICAL BOOST-SUSTAIN ROCKET MOTOR

RIGHTS OF THE GOVERNMENT

The invention described herein may be manufactured and used by or for the Government of the United States for all governmental purposes without the payment of any royalty.

BACKGROUND OF THE INVENTION

Cylindrical solid rocket motors for delivering boost-sustain, thrust-time performance are commonly known propulsion units. The grain in the cylindrical rocket motors have various configurations.

A spherical motor will not easily accommodate the usual designs for boost-sustain performance. Spherical surfaces are more progressive during burning than a cylindrical surface since the spherical surface varies as the square of the increasing radius.

BRIEF SUMMARY OF THE INVENTION

According to this invention, the tendency for the spherical burning surface to be more progressive than a cylindrical surface is offset by providing a plurality of regressive elements in the grain design.

Eight star point segment elements provide one regressive burning configuration. Another regressive burning configuration is provided with the use of eight slots in the forward portion of the fuel grain. An unrestricted conical surface underneath the nozzle insert, for the rocket motor, provides an additional regressive element.

Eight burning segments with parallel sides provide a large burning surface for the boost phase. Burnout of the parallel sided segments provides a sharp transition from the boost thrust level to the sustained thrust level.

IN THE DRAWINGS

FIG. 5 is an enlarged end view of the device of FIG. 1, with the nozzle, nozzle insert and igniter removed.

FIG. 6 is a partially schematic sectional view of the device of FIG. 5, taken along the line 6—6.

DETAILED DESCRIPTION OF THE INVENTION

Figure 1:
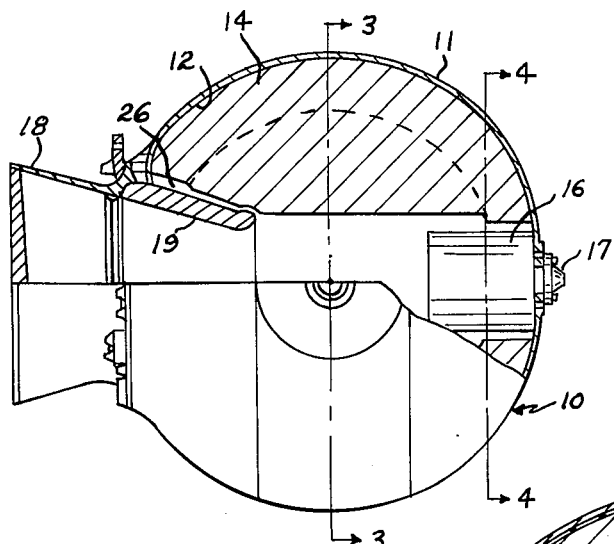
FIG. 1 is a partially schematic partially cut away view of a spherical solid rocket boost-sustain motor having a fuel grain configuration according to the invention.
Figure 3:
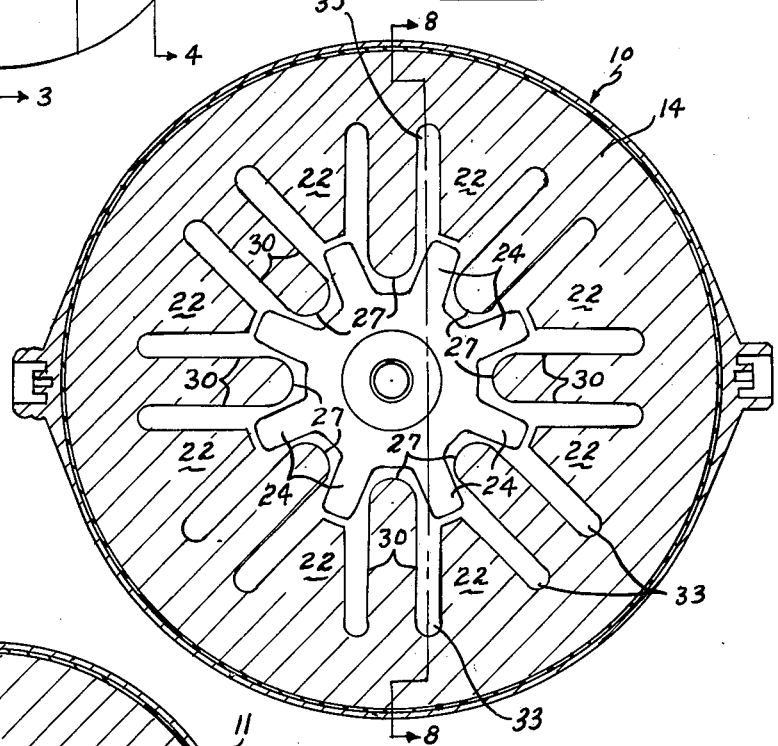
FIG. 3 is an enlarged partially schematic sectional view of the device of FIG. 1, taken along the lines 3—3.
Figure 2:
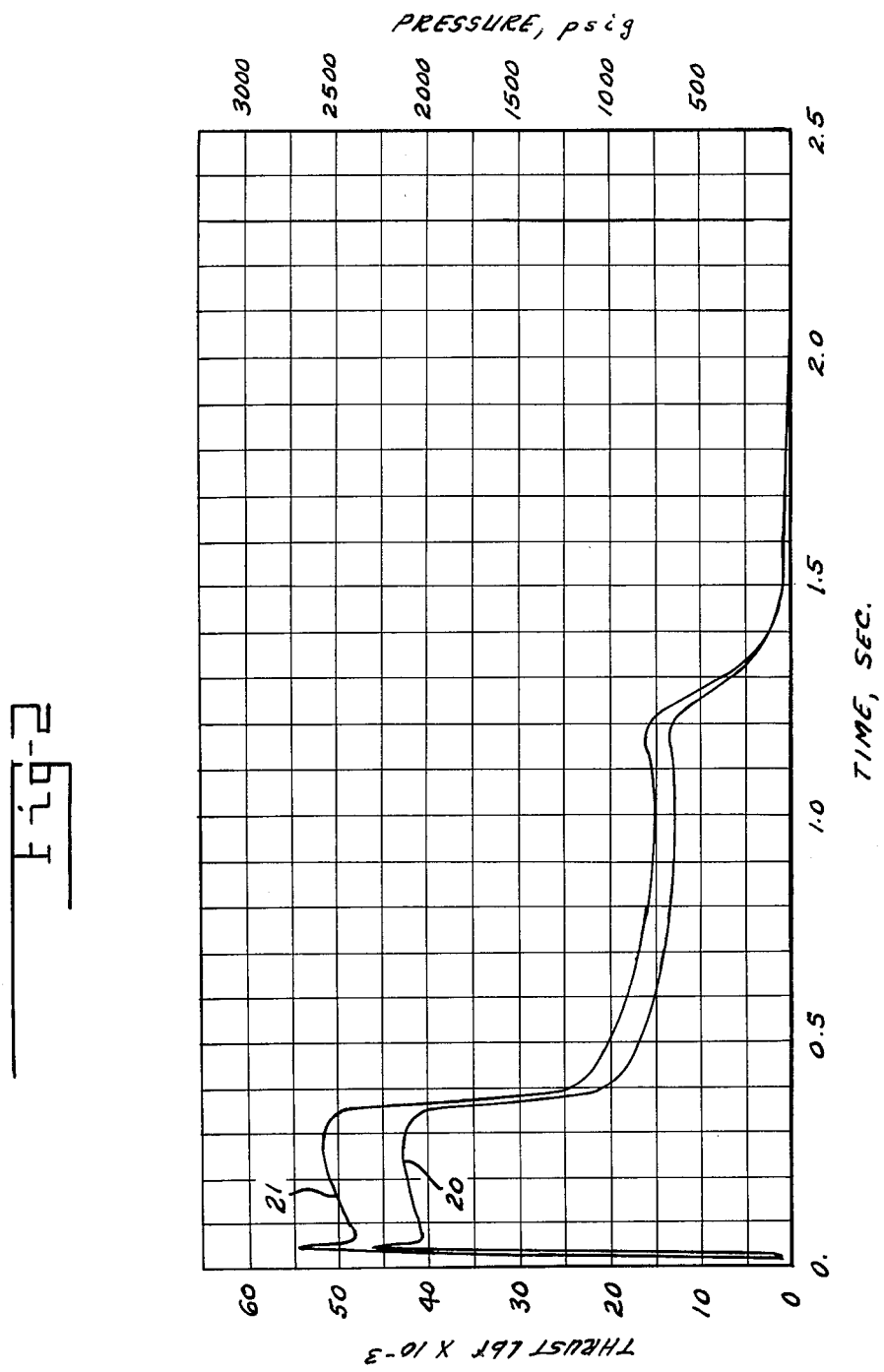
FIG. 2 shows typical pressure-time and thrust-time curves for a solid boost-sustain rocket motor.

Reference is now made to FIG. 1 of the drawing which shows a substantially spherical shaped rocket motor 10, having a casing including an outer shell 11 and an insulation liner 12, a fuel grain 14, an igniter 16, an initiator 17, a nozzle 18 and a throat insert 19. Typical desired performance pressure-time curve 20 and thrust-time curve 21 for rocket motors, delivering boost-sustain performance, are shown in FIG. 2.

If a purely spherical burning surface were used in a rocket motor as shown in FIG. 1, the burning surface, increasing with the square of the radius, would result in a final sustain pressure of approximately twice the pressure at the beginning of the sustain phase. Also, such a surface would not produce the relatively large amount of burning surface for the boost phase with the sharp transition to the sustain level.

Figure 4:
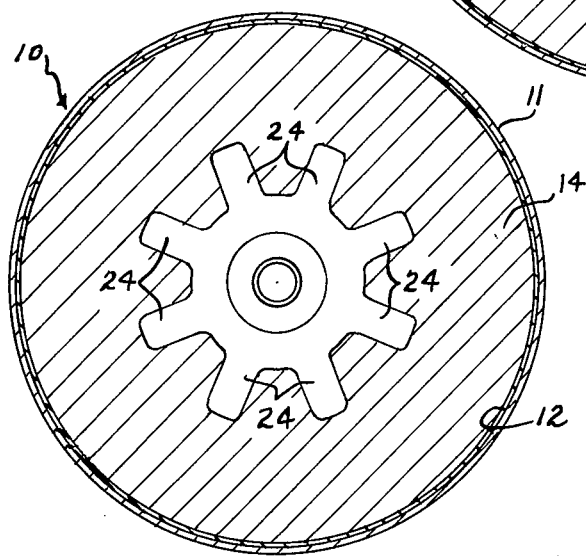
FIG. 4 is an enlarged partially schematic sectional view of the device of FIG. 1, taken along the line 4—4.
Figure 7:
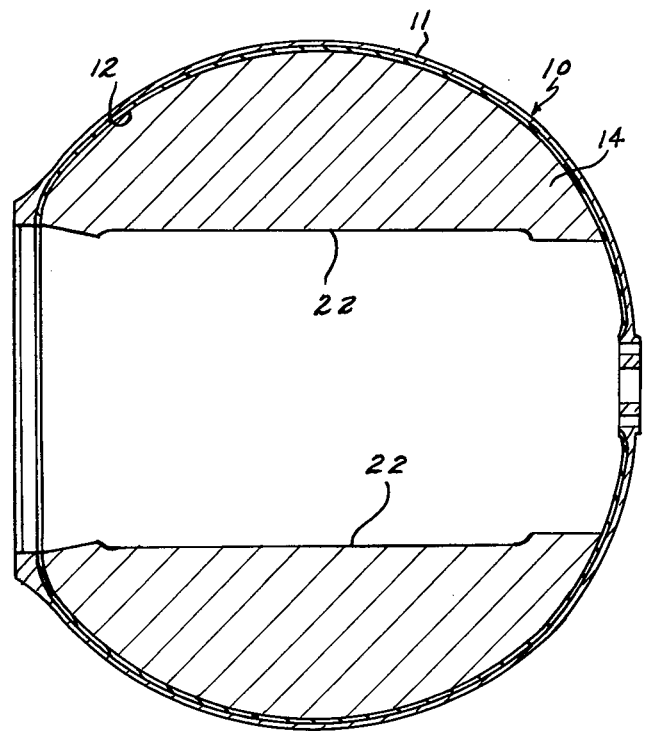
FIG. 7 is a partially schematic sectional view of the device of FIG. 5, taken along the line 7—7.

The fuel grain, as shown in greater detail in FIGS. 3–8, has regressive elements to compensate for the normal progressive burning surface which would be provided in a spherical motor. Eight star point segments 22, with a cross section as shown in FIG. 7, form one set of regressive burning surfaces. Eight slots 24 at the forward end of the chamber extending to the motor casing, as shown in greater detail in FIG. 4, provides additional regressive elements. An additional regressive element is obtained by providing an unrestricted space 26 underneath the throat insert 20, as shown in FIG. 1.

Figure 8:
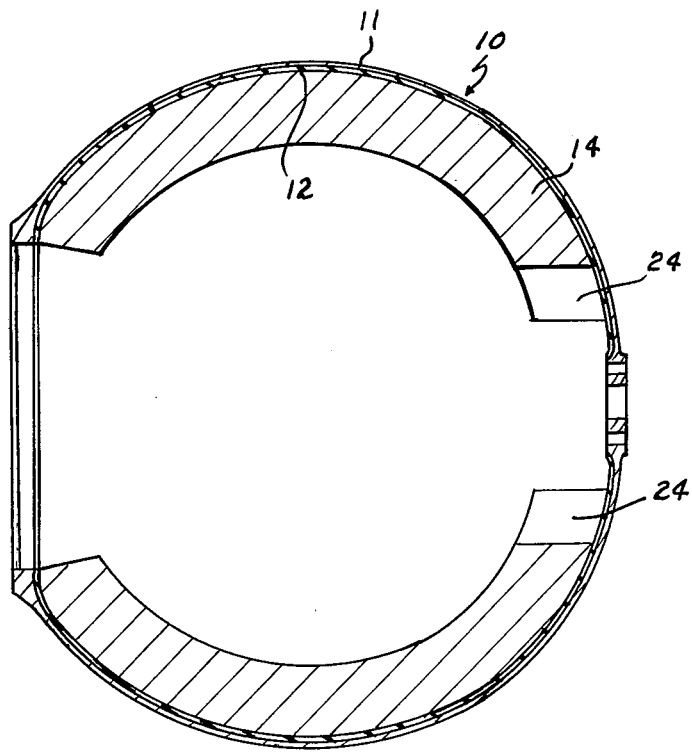
FIG. 8 is a partially schematic sectional view of the device of FIG. 3, taken along the line 8—8.

To provide the large burning surface for the boost phase, eight segments 27, with a cross section as shown in FIG. 6, are positioned between the eight star elements. The segments 27 have parallel sides 30 to provide a large burning surface for boost operation. When the burning from the opposite sides 30 of each segment reaches the center of the segments, a sharp transition to sustain thrust will be provided. The cross section of the fuel grain at the position of slots 33, between star segments 22 and boost segments 27, is shown in FIG. 8.

One propellant which may be used for the fuel grain has 85% solids loaded propellant in a carboxy-terminated polybutadiene binder. The solid propellants include 44% 10-micron ammonium perchlorate, 25% ultrafine ammonium perchlorate (0.8 microns), 14% aluminum powder (30 micron) and 2% iron oxide used as a burn rate catalyst.

There is thus provided a fuel grain configuration for a spherical rocket motor for boost-sustain operation which will provide the desired thrust-time performance.

I claim:

1. In a spherical solid rocket motor for delivering boost-sustain operation having a rocket motor casing; a thrust nozzle, a fuel grain igniting means, a fuel grain within said rocket motor casing, comprising: an internal cavity formed by a plurality of regressively burning star point first segments and a plurality of second segments, having parallel side walls, positioned between the star point segments and extending into the cavity a greater distance than the star point segments; said second segments having side walls substantially parallel to the side walls of the star point segments; said second segments having means, including the parallel side walls, for providing a large burning surface and a sharp transition from boost to sustain operation; means, for providing a plurality of radially extending slots at the forward end of said fuel grain; and means for providing an unrestricted burning area at the end of the fuel grain adjacent the thrust nozzle.

* * * * *